Jan. 6, 1970

S. M. KRINOV 3,488,148

METHOD FOR PREVENTING PRODUCT DEPOSITION ON
REACTION ZONE SURFACES

Filed April 8, 1965

STANLEY M. KRINOV
*INVENTOR.*

United States Patent Office 3,488,148
Patented Jan. 6, 1970

3,488,148
METHOD FOR PREVENTING PRODUCT DEPOSITION ON REACTION ZONE SURFACES
Stanley M. Krinov, Lexington, Mass., assignor to Cabot Corporation, Boston, Mass., a corporation of Delaware
Filed Apr. 8, 1965, Ser. No. 446,686
Int. Cl. C01g 25/02; C01b 33/00
U.S. Cl. 23—202                                                     4 Claims

ABSTRACT OF THE DISCLOSURE

In the process for producing pyrogenic metal oxides and metalloid oxides from gaseous reactants, the accumulation of large amounts of solid product on the reaction zone surfaces is prevented by continuously imparting sonic energy having a fundamental frequency of between about 20 and 20,000 cycles per second to at least one of said gaseous reactants prior to its introduction into the reaction zone.

---

This invention relates to metal oxides and more specifically to an improved process and apparatus for the production of pyrogenic metal oxides.

The manufacture of metal oxides and metalloid oxides such as titanium dioxide, silicon dioxide, zirconium dioxide and the like by pyrogenic processes wherein a metal compound in vapor form is oxidized and/or hydrolyzed at elevated temperatures by a free oxygen-containing gas to produce the corresponding metal oxide is well known. In typical processes of this type, a metal compound is reacted with a free oxygen-containing gas as illustrated in the following equation:

$$TiCl_4 + O_2 \rightarrow TiO_2 + 2Cl_2$$

Since such reactions are normally not self-sustaining, auxiliary heat is frequently provided to the reaction and/or reaction zone. Said auxiliary heat can be provided in any convenient manner but is preferably provided by reacting a fuel gas with a free oxygen-containing gas as illustrated in the following equation:

$$2CO + O_2 \rightarrow 2CO_2 + heat$$

Typically in the manufacture of metal oxides and metalloid oxides, the reactant gases, additives, etc., are charged through a burner apparatus and into a reaction zone wherein said gases are reacted to produce the corresponding metal or metalloid oxide. One of the more serious difficulties encountered in such pyrogenic processes resides in the fact that solid product tends to deposit on burner apparatus and particularly on or near outlets of burner apparatus. Said deposits or "whiskering" can result in significant changes in the geometry of the reaction flame and can thus have deleterious effects on the uniformity and quality of the product. Also, said deposits tend to periodically break off and fall into the product stream thereby adulterating said stream with product which has been subjected to excessively lengthy exposure at high temperatures. In accordance with this invention, however, the difficulties arising from the deposition of metal oxides and metalloid oxides on burner apparatus outlets have been largely eliminated.

It is a principal object of the present invention to provide an improved process for the production of pyrogenic metal oxides.

It is another object of the present invention to provide an improved process for the production of pyrogenic metal oxides and particularly pyrogenic titanium dioxide.

It is another object to provide improved burner apparatus for the production of pyrogenic metal oxides which is free from the difficulty of metal oxide deposition upon reactant outlets.

Other objects and advantages of the present invention will in part be obvious and will in part appear hereinafter.

In accordance with the present invention, it has been discovered that deposition of solids on burner apparatus can largely be eliminated by imparting sonic energy to the gas stream flowing therethrough.

Figure 1:
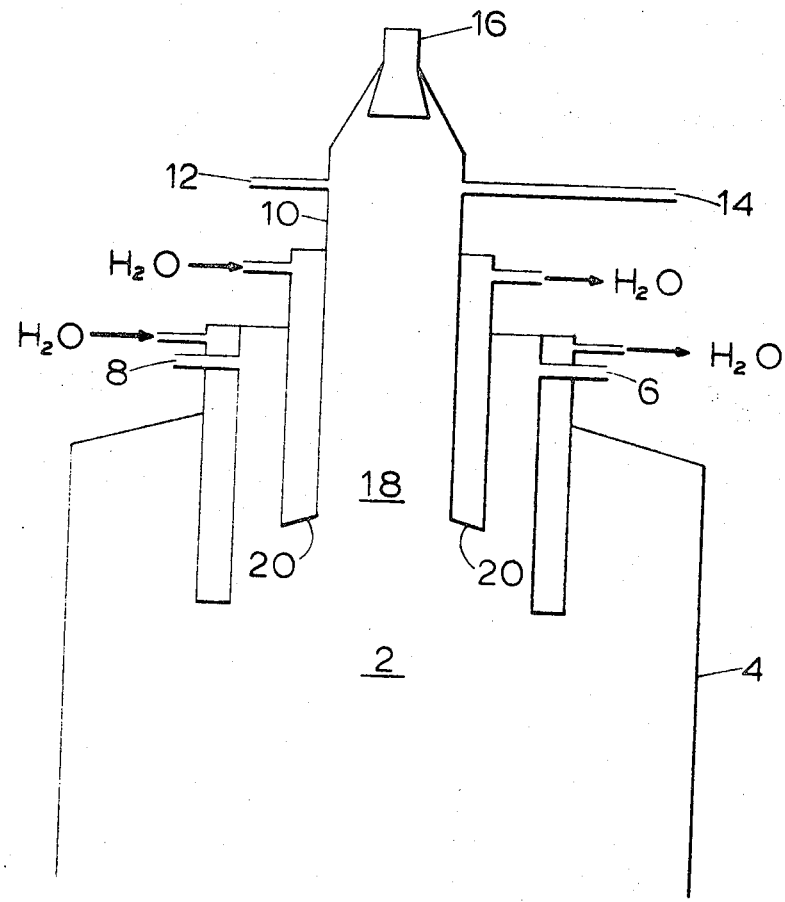
Figure 2:
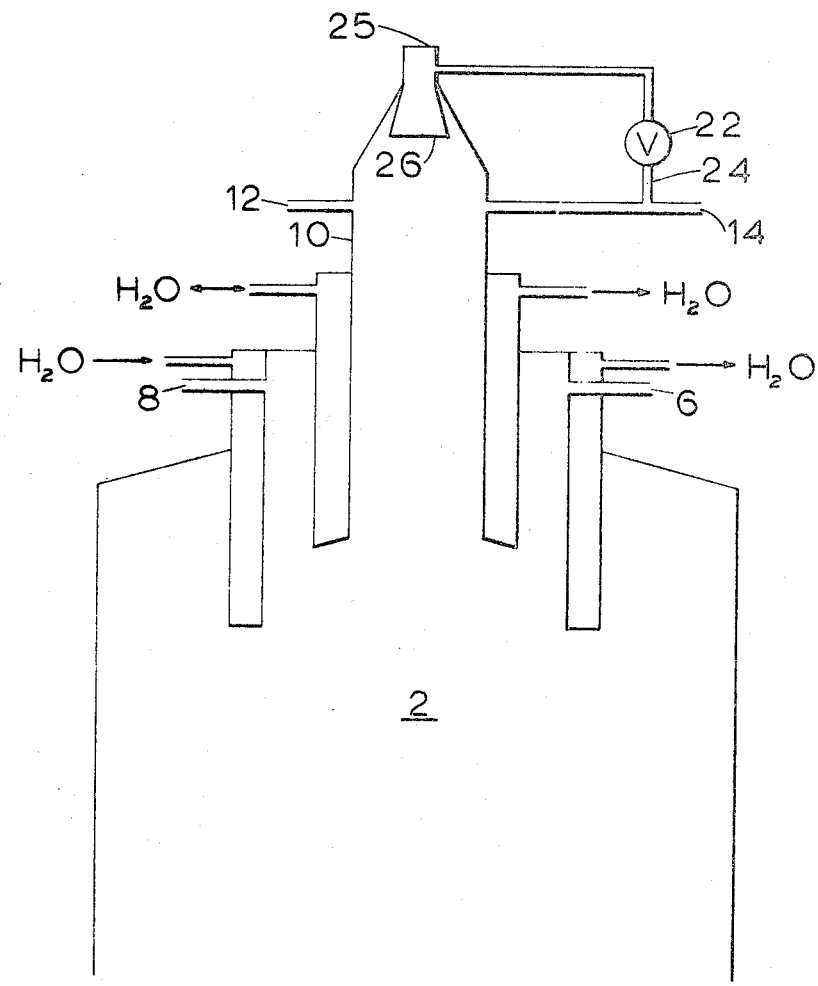

A better understanding of the present invention can be had when reference is made to the accompanying drawings forming part hereof wherein:

FIGURE 1 is a schematic diagrammatic longitudinal view of apparatus of the general type that can be utilized in practicing the present invention wherein sonic energy can be imparted to the gas stream exiting the burner; and FIGURE 2 is a schematic diagrammatic longitudinal view of a preferred embodiment of the present invention wherein gas(es) flowing into the burner apparatus is utilized to drive sonic energy generating means.

In a typical metal oxide producing run, referring now to FIGURE 1, reaction zone 2 is preheated by the introduction of a free oxygen-containing gas through inlet 6 and a fuel gas through inlet 8. The resulting mixture is ignited within reactor 4 and thereby heats reaction zone 2, temperature control being normally accomplished by regulating the flow of fuel gas and/or free oxygen-containing gas. After sufficient preheating of reaction zone 2 has been achieved, metal oxide forming reactants such as a metal halide in vapor form and a free oxygen-containing gas are introduced into injection column 10 through conduits 12 and 14. Said reactants course through said injection column and flow through outlet 18 into reaction zone 2 wherein metal oxide product is formed. In prior art processes and apparatus, deposition of various amounts of the product often occurs on or about surfaces 20. However, in accordance with the present invention, deposition is substantially prevented from forming and/or after deposition is substantially eliminated by imparting to the gas stream coursing through injection column 10 sonic energy produced by sonic energy generating means 16.

Any metallic compound which has a substantial vapor pressure at temperatures above about 800° F. is generally suitable for the purposes of producing a corresponding metal oxide in accordance with the present invention. More specifically, metal halides and/or oxyhalides such as titanium tetrachloride, silicon tetrachloride, zirconium tetrachloride, titanium oxychloride and/or mixtures thereof are entirely suitable. The metal halides are, however, generally preferred. The metal compound in vapor form can be introduced into the reaction zone by itself or in combination with any of the other reactants or inert gases utilized in producing the metal oxides.

Generally, any free oxygen-containing gas can be used in accordance with the present invention. However, more specifically, oxygen and/or air are the preferred free oxygen-containing gases utilized in the process of this invention. Moreover, the free oxygen-containing gas can be introduced into the reaction zone by itself or in combination with any of the other gases that are introduced into the reaction zone.

As mentioned hereinbefore, the pyrogenic metal oxides and metalloid oxides producing reaction does not normally generate sufficient heat to maintain an efficient reaction. Therefore, the reaction zone is usually preheated and/or a supply of heat is provided thereto during operations in order to maintain temperatures therein which will provide an efficient metal oxide producing process. Generally, therefore, any fuel gas such as carbon monoxide, methane or butane and a free oxygen-containing gas can be used for preheating and/or supplying heat to the reaction zone and/or the reactants. Preferably, however, the fuel gas utilized is carbon monoxide because carbon monoxide is relatively readily available.

Moreover, in producing titanium dioxide by the oxidation of titanium tetrachloride, it is generally desirable that fuel gases containing hydrogen be avoided or be utilized only in limited quantities.

For the purposes of the present invention, "sonic energy" refers to periodic alternate rarification and densificatlion (vibration) of an elastic medium. The periodicity or fundamental frequencies contemplated in the present invention comprise a range of between about 20 and about 20,000 cycles per second. Preferred, however, are fundamental frequencies between about 100 and 500 cycles per second.

The amount of sonic energy, i.e. the amplitude of the sound waves, that should be imparted to the gas stream is subject to considerable variation and is dependent upon parameters such as the particular design and size of the burner apparatus, the flow rates of the gases flowing through the burner, the particular metal oxides or metalloid oxide produced, etc. Suffice it to say that said amplitude should be sufficient to produce the desired effect of maintaining the burner outlets substantially free from solids deposition thereon. The optimum combination of amplitude and frequency required for any particular situation can best be determined during operations.

The size and design specifications of the sonic generator means forming part of the present invention are normally flexible and many variations can be utilized provided that said generator means can impart to a gas stream sonic energy which has (1) a frequency within the ranges discussed hereinbefore and (2) sufficient energy (amplitude) to maintain the outlets of the burner apparatus substantially free from solids deposition. For instance, any means which can convert or transduce one form of energy to sonic energy and impart said energy to a gas stream, such as an electric horn or siren is generally suitable. Preferred, however, are gas operated horns and sirens and in particular those gas operated horns and sirens in which the gas(es) utilized to operate the device is a gas(es) which is normally introduced into the reactor. An example of a sonic energy generator means of this type is illustrated in FIGURE 2.

During a typical metal oxide producing run of the type described hereinbefore in connection with FIGURE 1, a portion or all of the free oxygen-containing gas flowing through conduit 14 is shunted through valve 22 and gas operated horn 25. Sonic energy is imparted therein to said gas and the resulting vibrating column of gas exits through outlet 26 into injection column 10.

The materials from which the sonic energy generator can be fabricated are subject to considerable variation. In general, any material which is substantially inert to its environment at the temperature encountered during the operations is generally suitable. Specific examples of materials that are generally suitable are metals such as aluminum, metallic alloys such as stainless steel, ceramics such as porcelain, plastics such as phenolics and the like.

A better understanding of the present invention can be had when reference is made to the following examples which are illustrative in nature and should in no way be construed as limiting the scope of the invention.

EXAMPLE 1

To apparatus of the type illustrated in FIGURE 2 comprising a water cooled aluminum injection column 10 having an I.D. of 1 inch and a length of about 10 inches, there is introduced oxygen and carbon monoxide at a rate of about 100 s.c.f.h. each through inlets 6 and 8 respectively. The mixture within reactor 4 is ignited and after reaction zone 2 has been preheated to a temperature of about 1400° F., about 250 s.c.f.h. titanium tetrachloride vapor at a temperature of about 500° F. and about 250 s.c.f.h. oxygen are introduced through conduits 12 and 14 respectively into reactor 4 through column 10. The reaction is allowed to proceed for about 24 hours. Surfaces 20 are examined after shutdown and are found to have substantial deposits of solid titanium dioxide thereon.

EXAMPLE 2

This example is a duplicate of Example 1 except that during the reaction, gas operated horn 25 is operated by adjusting valve 22 so as to shunt about one half of the total oxygen flow through conduit 14 into horn 25, which produces fundamental low frequency sonic energy of about 200 cycles per second that is imparted to the gas stream flowing through injection column 10. After a period of about 24 hours the reaction is discontinued. Surfaces 20 are examined and are found to be substantially free from solids deposition.

Obviously, many changes can be made in the above examples and accompanying drawings without departing from the scope of the present invention.

For instance, gases that can be utilized to produce the sonic energy other than the oxygen specifically mentioned in the above example are nitrogen, air, volatilized metal compounds, recycle gas and the like. Moreover, said energy can be produced electronically or by any other method so long as said energy is imparted to the gas stream.

Also, the position of the sonic energy generator means can be changed so long as sufficient energy can be imparted to the gas stream to accomplish substantially the results illustrated in the above examples. For instance, the sonic energy generator means can be attached to the side of injection column 10 or to one of the conduits through which any of the reactant gases enters injection column 10. Moreover, a plurality of sonic energy generator means can also be employed.

Also, the metal oxide producing process illustrated in the above-mentioned examples is obviously not limiting; the production of metal and metalloid oxides other than titanium dioxide such as, for instance, pyrogenic silica production can also be afforded the benefits accomplished by the present invention.

Accordingly, it is intended that the above disclosure be regarded as illustrative and as in no way limiting the scope of the invention.

What I claim is:

1. In the process for producing pyrogenic metal oxides and metalloid oxides which comprises introducing into a suitably heated reaction zone a stream of a free-oxygen containing gas and a stream of a suitable metal compound or metalloid compound in the vapor state, the improvement which comprises imparting sonic energy having a fundamental frequency of about 20 to about 20,000 cycles per second to at least one of said streams as it enters said reaction zone whereby large accumulations of solids on the surface of said reaction zone are prevented.

2. The process of claim 1 wherein sonic energy having a fundamental frequency between about 100 and about 500 cycles per second is imparted to at least one of said streams.

3. The process of claim 1 wherein said compound is selected from the group consisting of compounds of titanium, zirconium and silicon.

4. The process of claim 1 wherein said compound comprises vaporized titanium halide and said free-oxygen containing gas is selected from the group consisting of air and oxygen.

References Cited

UNITED STATES PATENTS

| 2,742,408 | 4/1956 | La Porte | 204—162 |
| 3,203,762 | 8/1965 | Carpenter | 23—202 |
| 3,212,756 | 10/1965 | Hutton | 134—1 |
| 3,403,001 | 9/1968 | Mas et al. | 23—202 |

HOWARD S. WILLIAMS, Primary Examiner

U.S. Cl. X.R.

204—193